United States Patent
Li

[11] Patent Number: 6,069,755
[45] Date of Patent: May 30, 2000

[54] REAR-VIEW MIRROR FOR VEHICLES

[76] Inventor: Shiqing Li, 13 North Courtyard, Tsinghua University, Beijing, P. R., China, 100084

[21] Appl. No.: 08/716,241

[22] PCT Filed: Mar. 21, 1995

[86] PCT No.: PCT/CN95/00018

§ 371 Date: Jan. 6, 1997

§ 102(e) Date: Jan. 6, 1997

[87] PCT Pub. No.: WO95/25969

PCT Pub. Date: Sep. 28, 1995

[30] Foreign Application Priority Data

Mar. 21, 1994 [CN] China .............................. 94 2 07489

[51] Int. Cl.[7] ................................. G02B 5/10; B60R 1/06
[52] U.S. Cl. ............................................ 359/868; 359/727
[58] Field of Search ................................. 359/864, 866, 359/868, 850, 851, 727, 728

[56] References Cited

U.S. PATENT DOCUMENTS

| | | | |
|---|---|---|---|
| 4,331,382 | 5/1982 | Graff | 359/868 |
| 4,449,786 | 5/1984 | McCord | 359/868 |
| 5,005,963 | 4/1991 | Schmidt et al. | 359/868 |
| 5,084,785 | 1/1992 | Albers et al. | 359/868 |
| 5,096,281 | 3/1992 | Windebank et al. | 359/868 |
| 5,307,211 | 4/1994 | Schmidt et al. | 359/868 |
| 5,321,556 | 6/1994 | Joe | 359/866 |
| 5,589,984 | 12/1996 | Schmidt et al. | 359/868 |

FOREIGN PATENT DOCUMENTS

| | | | |
|---|---|---|---|
| 90206894 | 12/1990 | China . | |
| 0051635 | 4/1980 | Japan | 359/868 |
| 0106403 | 8/1980 | Japan | 359/868 |
| 0144240 | 6/1990 | Japan | 359/850 |

*Primary Examiner*—Ricky D. Shafer
*Attorney, Agent, or Firm*—Chittaranjan N. Nirmel; Jones Jain, L.L.P.

[57] ABSTRACT

A rear-view mirror for a vehicle has a convex reflecting surface composed of a plurality of distinct curved surfaces each having a selected shape that are smoothly joined with each other with a continuously varying average curvature. The average curvature increases gradually along the vertical direction from the top to the bottom of the mirror and along the transverse horizontal direction away from the body of the vehicle. The mirror provides a wide viewing around both sides and of the rear of the vehicle without blind spots and provides a clear image with little distortion that is visually acceptable to a driver.

14 Claims, 6 Drawing Sheets

REAR-VIEW MIRROR FOR VEHICLES

FIELD OF THE INVENTION

The present invention relates to mirror, in particular, to a vehicular mirror.

BACKGROUND OF THE INVENTION

The prior art vehicular rear-view mirror is either flat or spherical in shape, which provides narrowly viewing and blind spots. Accordingly, it is not helpful for safe driving.

To improve the prior art mirror, Chinese Utility Model No. 90206894.6, filed on May 26, 1990, disclosed a rear-view mirror for a vehicle in which the reflecting surface of the mirror is a convex shape, which is composed of a number of spherical surfaces of different curvature that are smoothly joined with each other and the curvature of the convex gradually increases from the top to the bottom i.e., the curvature of the upper portion of the reflecting surface is small or even zero while the curvature of the lower portion of the reflecting surface is large. Moreover, the curvature of the reflecting surface gradually increases along its lower portion as it is away from the body of the vehicle. This mirror is better than others since its viewing is broader and clear while the blind spots are eliminated. However, since the curvature of such a mirror increases only along the vertical direction and remains unchanged on the upper portion of the mirror along the horizontal direction, its viewing is not wide enough on the upper portion of the mirror.

SUMMARY OF THE INVENTION

Therefore, a principal object of the present invention is to provide a rear-view mirror for vehicle that has a wide viewing without blind spots.

A further object of the present invention is to provide a clear mirror image with a distortion that is tolerable to human sight.

The reflecting surface of the mirror in accordance with the present invention is a convex shape composed of a plurality of differential curved surfaces that are smoothly joined with each other. An average of the curvature on the differential curved surfaces gradually increases along both the vertical direction from the top to bottom and the horizontal direction away from the body of the vehicle.

The change of the curvature in both vertical and horizontal directions of the mirror in accordance with the present invention may be either homogeneous or inhomogeneous. In the latter case, the variation rate of the average of the curvature also gradually increases along both the vertical direction from the top to the bottom of the mirror and the horizontal direction away from the body of the vehicle.

As the average of the curvature increases in both vertical and horizontal directions of the mirror in accordance with the present invention, the differences among the average curvature of each differential curved surface should be kept within such a range that the image in the mirror in accordance with the present invention is clear and the distortion of the image is within a tolerance that is acceptable to human sight.

As one aspect of the present invention, since the distance from a driver to a left mirror and a right mirror is different, the curvatures and the variation rates of the differential curved surfaces are corresponding different. For a vehicle that has a driver's seat on the left-side, the left mirror, of course, is closer than the right mirror to the driver. Therefore, the curvature on the lower and outer portion is smaller than that of the right mirror and the variation rate of the curvature is smaller than that of the right mirror either. It is clearly understood that this principle applies in obvious manner to a situation in which the driver seat is on the right side of the vehicle.

In accordance, with the present invention, the range of the average of the curvature and the variation rate along both vertical and horizontal directions of the mirror will depend on the viewing range and the contour of the mirror. The wider desired viewing range is requested, the larger will be the variation in the range of the average. For example, for the same viewing range, the smaller the contour of the mirror becomes, the larger will be the variation rate of the average, and the larger the contour of the mirror becomes, the smaller will be the variation range of the average. Experiments and tests in accordance with the present invention show that, for a regular vehicle, the average of the curvature preferably ranges within $5.0 \times 10^{-4}$ to $50 \times 10^{-4}$ and the variation rate of the curvature preferably ranges within $0.01 \times 10^{-4}$ per mm to $0.15 \times 10^{-4}$ per mm.

DETAILED DESCRIPTION OF THE PREFERRED EMBODIMENTS

The detailed description of the preferred embodiments in accordance with the present invention is given below together with the accompanying drawings.

The First Embodiment

Figure 3:
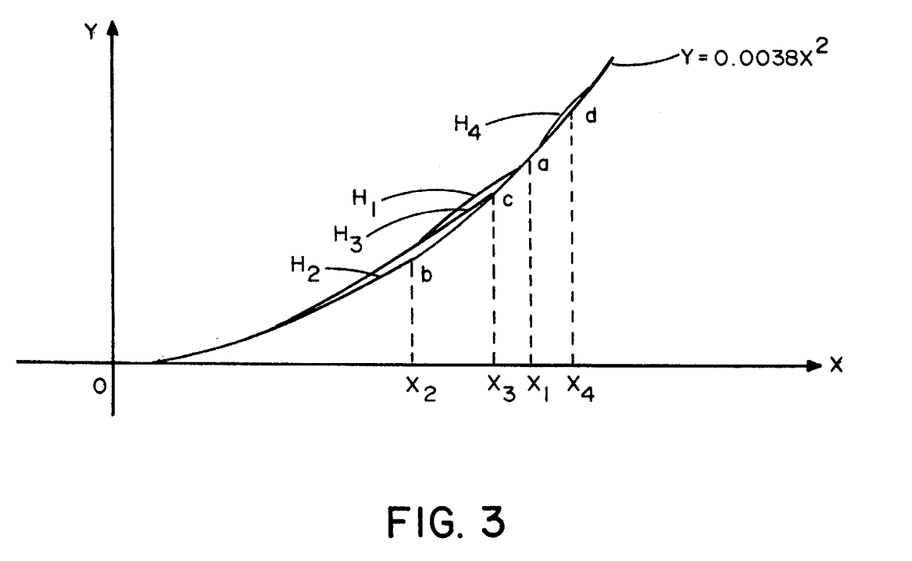
FIG. 3 is a view showing in cross-section the boundaries of the reflecting surface in the x-y plane for parabola shape in the rear-view mirror embodiment shown in FIG. 1.

The curve shown in FIG. 3 is a part of a parabola, and is preferably defined by an equation $y=0.0038\ x^2$. As is known, the curvature of the parabola varies continuously. The four boundaries of the rear-view mirror given in the first embodiment in accordance with the present invention are taken from this curve. The four points $X_1=300$, $X_2=204$, $X_3=286$, and $X_4=302$ are sampled from the parabola, and are named as a, b, c, and d respectively. Starting from points a, b, c, and d and along the direction of the original point of the coordinate, four segments of arcs are cut off from the curve. The four chords corresponding to the four arcs are defined as $$H_1 = \sqrt{400^2 + 10^2}$$

(mm), $$H_2 = \sqrt{200^2 + 10^2}$$

(mm), $H_3=400$(mm), and $H_4=200$ (mm) respectively. The four arcs are used to form the four boundaries of the reflecting surface given in this embodiment.

Figure 1:
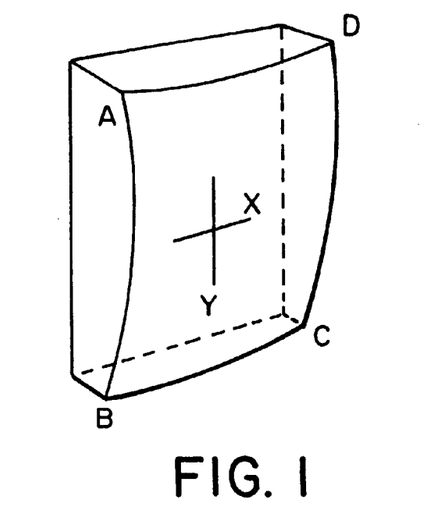
FIG. 1 shows the reflecting surface of the rear-view mirror mounted on the right side of the vehicle in accordance with present invention, wherein AB, BC, CD, and DA are four boundaries of the reflecting surface, and arrow X indicates the horizontal direction and arrow Y represents the vertical direction, such that, arrow X points in a transverse direction away from the body of the vehicle horizontally, while arrow Y points vertically downward to the ground.
Figure 2:
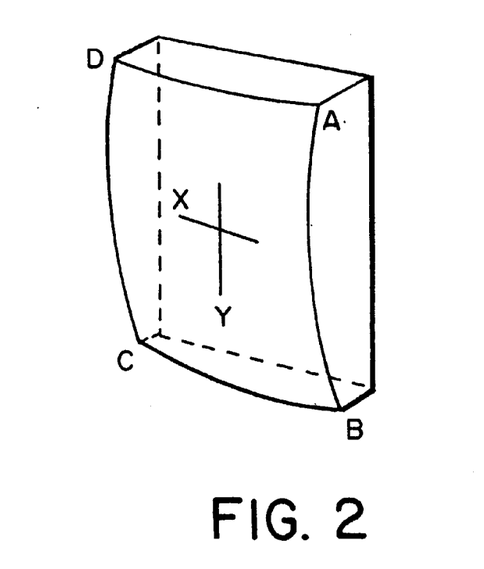
FIG. 2 shows the reflecting surface of the rear-view mirror mounted on the left side of the vehicle in accordance with the present invention wherein, the same symbols represent the same components as those shown in FIG. 1.

On the basis of the change of the average of the curvature, the four points A, B, C, and D shown in FIG. 1 or the four points A', B', C', and D' as shown in FIG. 2 are not located on the same plane. If the three points A, D, and C (or A', D', and C') are taken on the same plane (the plane of paper), point B (or point B') is located over the plane of paper.

Figure 5:
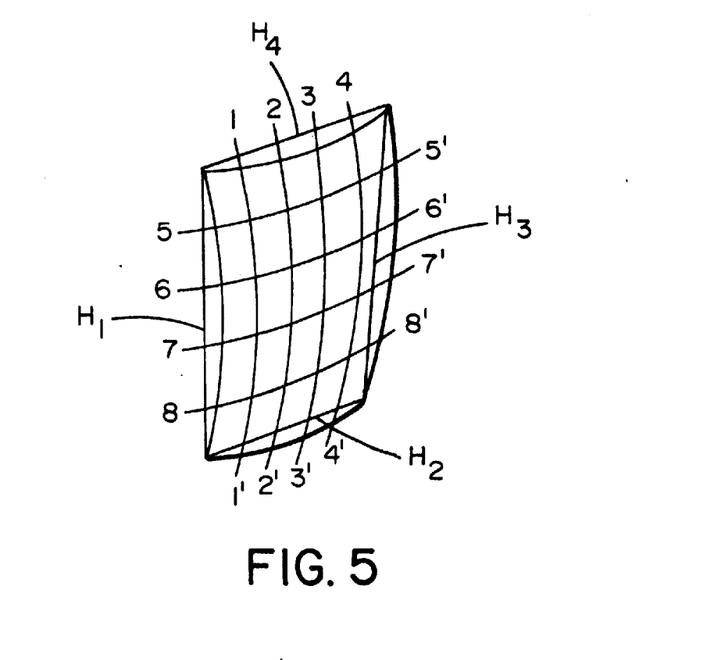
FIG. 5 is a view of longitudinal and transverse cross-sections for the right side rear-view mirror, showing the variation rate of the average curvature of the reflecting surface in accordance with the present invention.

The first embodiment is a rear-view mirror mounted on the right side of, for example, a coach. As shown in FIG. 5, its boundaries are the arcs corresponding to the four chords $H_1$, $H_2$, $H_3$, and $H_4$ on the curve $y=0.0038\ x^2$.

The following description refers to the average curvature for the sampled sections of the reflecting surface of the right side rear-view mirror in the first embodiment.

As shown in FIG. 5, since the four boundaries of the rear-view mirror are cut off from the parabola $y=0.0038\ x^2$, the curvature of each boundary can be calculated. Four longitudinal sections are defined by 1-1', 2-2', 3-3', and 4-4' along the horizontal direction and the distance between any two adjacent longitudinal sections is 40 mm. Also, the distance from either boundary to its closed longitudinal section is 40 mm. The four crossing sections are defined by 5-5', 6-6', 7-7', and 8-8' along the longitudinal direction and the distance between any two adjacent crossing sections is 80 mm, and the distance from either boundary to its closest crossing section is 80 mm either.

On the chord of longitudinal section of 1-1', the points are taken at every 45 mm along the vertical direction; corresponding to those points, the values of the average curvature for the differential surfaces are listed as follows:

0.00053416, 0.00063161, 0.00077311,
0.00097228, 0.00124937, 0.00163241,
0.00215379, 0.00283154, 0.00361800

On the chord of longitudinal section of 2-2', the points are taken at every 45 mm along the vertical direction; corresponding to those points, the values of the average curvature for differential surfaces are listed as follows:

0.00057589, 0.00067956, 0.00083014,
0.00104161, 0.00133468, 0.00173845,
0.00228793, 0.00300682, 0.00385594

On the chord of longitudinal section of 3-3', the points are taken at every 45 mm along the vertical direction; corresponding to those points, the values of the average curvature for differential surfaces are listed as follows:

0.00063580, 0.00075158, 0.00091917,
0.00115327, 0.00147501, 0.00191333,
0.00250222, 0.00326344, 0.00415484

On the chord of longitudinal section of 4-4', the points are taken at every 45 mm along the vertical direction; corresponding to those points, the values of the average curvature for differential surfaces are listed as follows:

0.00071782, 0.00085361, 0.00104892,
0.00131950, 0.00168643, 0.00217607,
0.00281544, 0.00361343, 0.00451336

On the chord of longitudinal section of 5-5', the points are taken at every 45 mm along the vertical direction, corresponding to those points, the values of the average curvature for differential surfaces are listed as follows:

0.00070679, 0.00072323, 0.00074847,
0.00078365, 0.00083020, 0.00088986,
0.00096481, 0.00105769, 0.00117173

On the chord of longitudinal section of 6-6', the points are taken at every 45 mm along the vertical direction; corresponding to those points, the values of the average curvature for differential surfaces are listed as follows:

0.00107583, 0.00109625, 0.00113044,
0.00118054, 0.00124917, 0.00133950,
0.00145538, 0.00160131, 0.00178240

On the chord of longitudinal section of 7-7', the points are taken at every 45 mm along the vertical direction; corresponding to those points, the values of the average curvature for the differential surfaces are listed as follows:

| |
|---|
| 0.00173110, 0.00176173, 0.00181205, |
| 0.00188579, 0.00198716, 0.00212082, |
| 0.00229165. 0.00250423, 0.00276175 |

On the chord of longitudinal section of 8-8', the points are taken at every 45 mm along the vertical direction; corresponding to those points, the values of the average curvature for differential surfaces are listed as follows:

| |
|---|
| 0.00279425, 0.00286422, 0.00295473, |
| 0.00307003, 0.00321625, 0.00339699, |
| 0.00361395, 0.00386457, 0.00413955 |

It is shown by the above data that in the first embodiment, the values of both average curvature of the differential surfaces and the variation rate of the curvature gradually and inhomogneously increase along both vertical direction from the top to the bottom and horizontal direction away from the body of the vehicle. In the first embodiment, the values of average curvature range from $5.3416 \times 10^{-4}$ to $45.1336 \times 10^{-4}$. The values of variation rate of the curvature are within the range from $0.0232 \times 10^{-4}$ to $0.1054 \times 10^{-4}$.

The Second Embodiment

Figure 4:
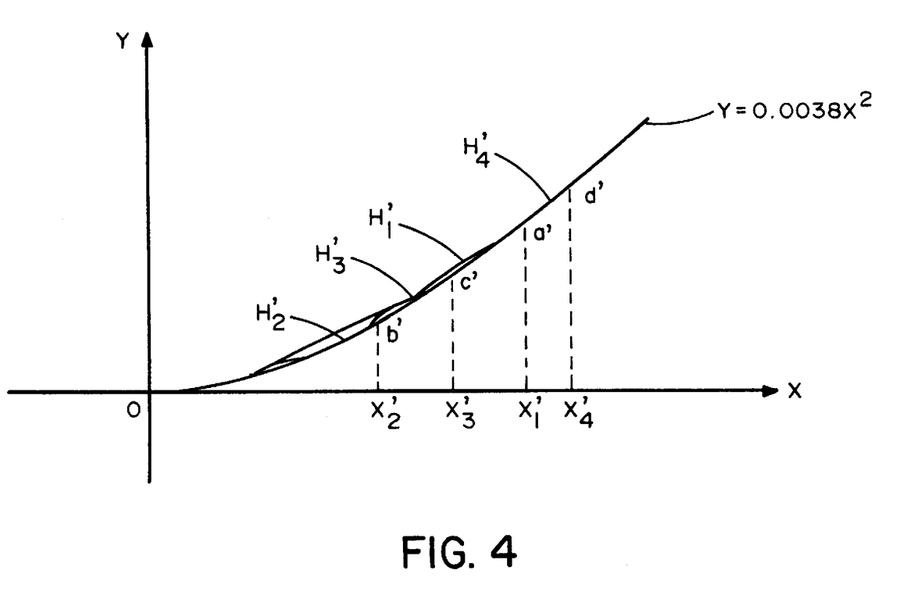
FIG. 4 is a view showing in cross-section the boundaries of the reflecting surface in the x-y plane for the parabola shape in the rear-view mirror embodiment shown in FIG. 2.
Figure 6:
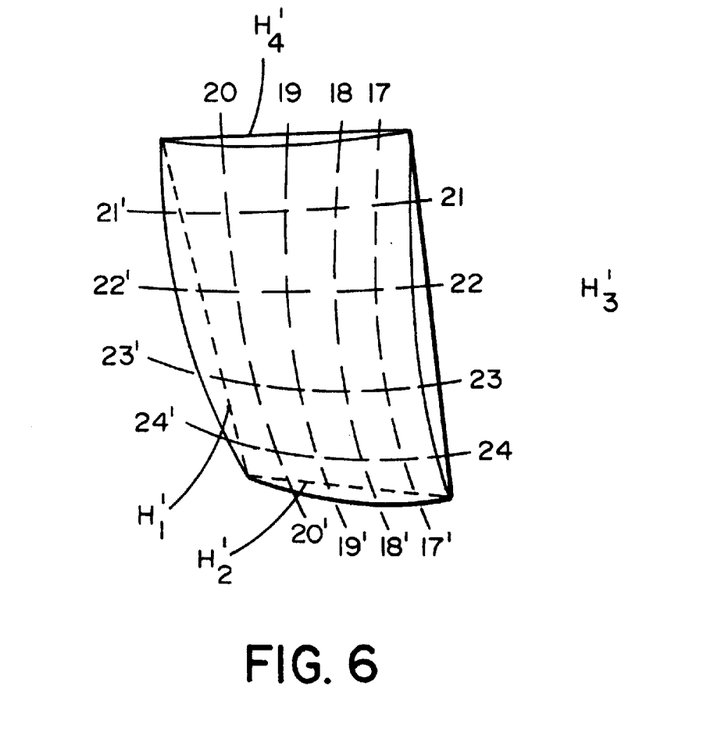
FIG. 6 is a view of the longitudinal and transverse cross-sections for the left side rear-view mirror, showing the variation rate of the average curvature of the reflecting surface in accordance with the present invention.

The second embodiment is the rear-view mirror mounted on the left side of the vehicle, as shown in FIG. 6. The boundaries of the reflecting surface are also taken from the parabola of $y=0.0038\ x^2$. As shown in FIG. 4, the four points $X'_1=305$, $X'_2=220$, $X'_3=286$, and $X'_4=310$ are taken from said parabola and are named as a', b', c', and d' respectively Starting from these points along the original point of the coordinate, four segments of arcs are taken from the curve. The four chords corresponding to the four arcs are given as $$H'_1 = \sqrt{400^2 + 10^2}$$

(mm), $$H'_2 = \sqrt{200^2 + 10^2}$$

(mm), $H'_3=400$(mm), and $H'_4=200$ (mm) respectively. The four arcs can be used to form the four boundaries of the left side rear-view mirror given in this embodiment.

The following description refers to the average curvature for the sampled sections of the reflecting surface of the left side rear-view mirror in the second embodiment:

As shown in FIG. 6, since the four boundaries of the left-side rear-view mirror are cut off from the parabola $y=0.0038\ x^2$, the curvature of each boundary can be calculated. Four longitudinal sections are defined by 17-17', 18-18', 19-19', and 20-20' along the horizontal direction and the distance between any two adjacent longitudinal sections is 40 mm. Also, the distance from either boundary to its closest longitudinal section is 40 mm. The four cross sections are defined by 21-21', 22-22', 23-23', and 24-24' along the longitudinal direction and the distance between any two adjacent cross-sections is 80 mm, and the distance from either boundary to its closest crossing section is 80 mm either.

On the chord of longitudinal section of 17-17', the points are taken at every 45 mm along the vertical direction; corresponding to those points, the values of the average curvature for differential surfaces are listed as follows:

| |
|---|
| 0.00053142, 0.00061175, 0.00072084, |
| 0.00088212, 0.00111608, 0.00145130, |
| 0.00192026, 0.00253899, 0.09325407 |

On the chord of longitudinal section of 18-18', the points are taken at every 45 mm along the vertical direction; corresponding to those points, the values of the average curvature for differential surfaces are listed as follows:

| |
|---|
| 0.00058763, 0.00066716, 0.00078625, |
| 0.00095875, 0.00120536, 0.00155472, |
| 0.00203967, 0.00267730, 0.00341603 |

On the chord of longitudinal section of 19-19', the points are taken at every 45 mm along the vertical direction; corresponding to those points, the values of the average curvature for differential surfaces are listed as follows:

| |
|---|
| 0.00064746, 0.00074374, 0.00088260, |
| 0.00107894, 0.00135419, 0.00173732, |
| 0.00226073, 0.00294008, 0.00372007 |

On the chord of longitudinal section of 20-20', the points are taken at every 45 mm along the vertical direction; corresponding to those points, the values of the average curvature for differential surfaces are listed as follows:

| |
|---|
| 0.00072485, 0.00084976, 0.00102530, |
| 0.00126020, 0.00160573, 0.00206604, |
| 0.00268264, 0.00346727, 0.00435603 |

On the chord of longitudinal section of 21-21', the points are taken at every 25 mm along the vertical direction; corresponding to those points, the values of the average curvature for differential surfaces are listed as follows:

| |
|---|
| 0.00063742, 0.00066166, 0.00069286, |
| 0.00073237, 0.00078204, 0.00084443, |
| 0.00092310, 0.00102307, 0.00115143 |

On the chord of longitudinal section of 22-22', the points are taken at every 25 mm along the vertical direction; corresponding to those points, the values of the average curvature for differential surfaces are listed as follows:

| |
|---|
| 0.00092607, 0.00095387, 0.00099257, |
| 0.00104515, 0.00111598, 0.00121145, |
| 0.00134113, 0.00151960, 0.00176942 |

On the chord of longitudinal section of 23-23', the points are taken at every 25 mm along the vertical direction; corresponding to those points, the values of the average curvature for differential surfaces are listed as follows:

0.00148529, 0.00151672, 0.00156401,
0.00163271, 0.00173129, 0.00187318,
0.00208014, 0.00238846, 0.00286048

On the chord of longitudinal section of 24-24', the points are taken at every 25 mm along the vertical direction; corresponding to those points, the values of the average curvature for differential surfaces are listed as follows:

0.00246664, 0.00250600, 0.00256586,
0.00265488, 0.00278727, 0.00298711,
0.00329690, 0.00379481, 0.00463041

It is shown by the above data that in the second embodiment, the values of both average curvature of the differential surfaces and the variation rate of the curvature gradually and inhomogneously increase along both vertical direction from the top to the bottom and horizontal direction away from the body of the vehicle. In the second embodiment, the values of average curvature range from $5.3142 \times 10^{-4}$ to $43.5603 \times 10^{-4}$. The values of variation rate of the curvature are within a range from $0.0200 \times 10^{-4}$ to $0.1002 \times 10^{-4}$. In comparison with the corresponding data in the first embodiment, the average increase of the curvature and the variation rate of the curvature become smaller.

The Third Embodiment

Figure 7:
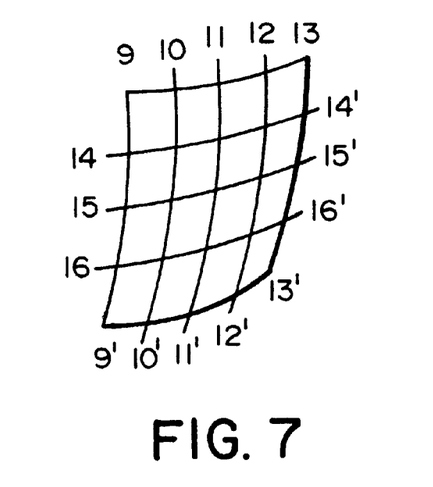
FIG. 7 is a view of longitudinal and transverse cross-sections for a mirror, showing the variation rate of the average curvature of the reflecting surface in accordance with another embodiment of the invention.
Figure 8:
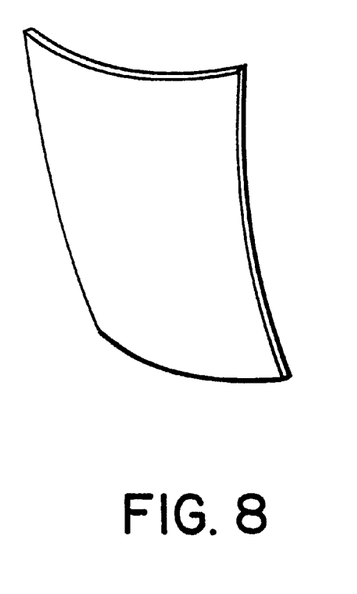
FIG. 8 is a view of the rear-view mirror in accordance with the present invention, which is vertically mounted on the left side of the vehicle.
Figure 9:
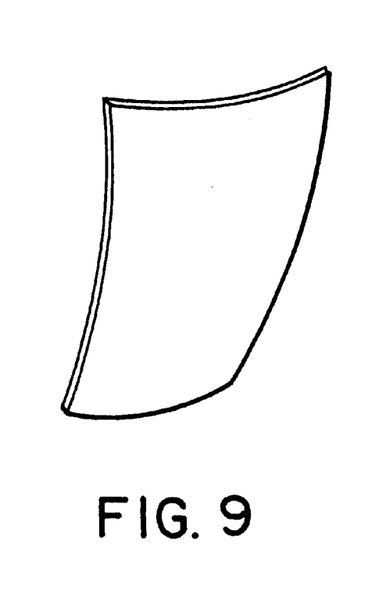
FIG. 9 is a view of the rear-view mirror in accordance with the present invention, which is vertically mounted on the right side of the vehicle.
Figure 10:
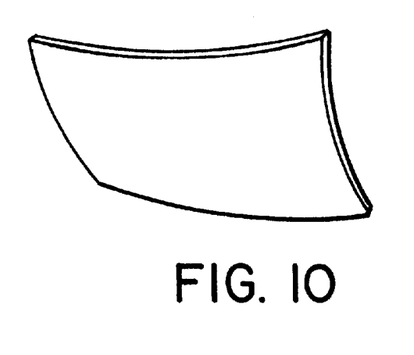
FIG. 10 is a view of the rear-view mirror in accordance with the present invention, which is horizontally mounted on the left side of the vehicle.
Figure 11:
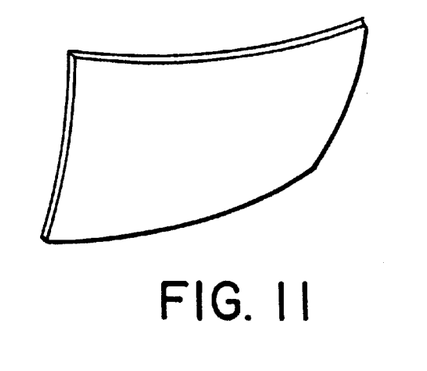
FIG. 11 is a view of the rear-view mirror in accordance with the present invention, which is horizontally mounted on the right side of the vehicle.
Figure 12:
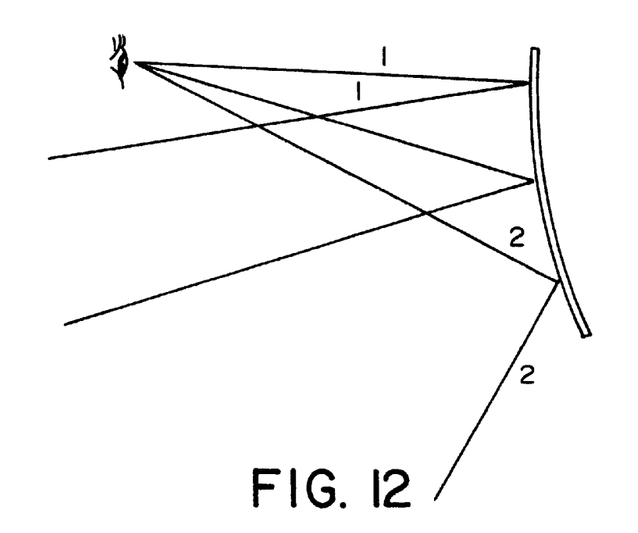
FIG. 12 shows the optical properties along a longitudinal section of the rear-view mirror being used.
Figure 13:
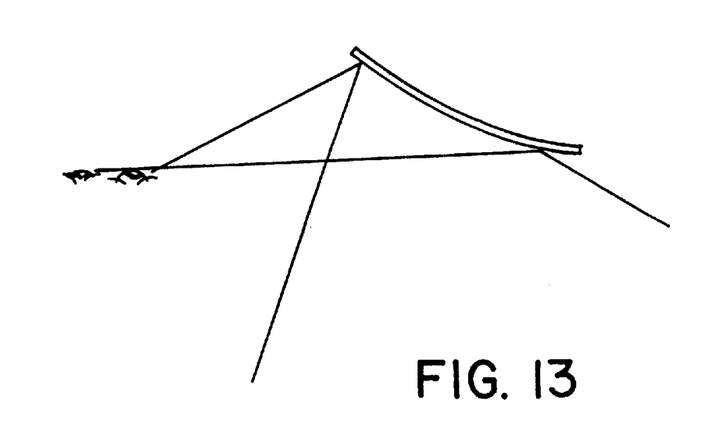
FIG. 13 shows the optical properties along a crossing section of the rear-view mirror being used.

The mirror shown in FIG. 7 of the third embodiment is a right-side rear-view mirror for a medium sized truck. Its reflecting surface is just a part of the rear-view mirror of the first embodiment, that is, the left boundary in FIG. 7 is the longitudinal section that is 45 mm away from the left boundary of the mirror in FIG. 5, while the upper boundary of the mirror in FIG. 7 is the crossing section which is 125 mm away from the upper boundary of the mirror in FIG. 5. The size of the reflecting surface for the rear-view mirror in the third embodiment is 270 mm×140 mm.

As shown in FIG. 7, five longitudinal sections of 9-9', 10-10', 11-11', 12-12' and 13-13' are taken along the horizontal direction of the mirror; wherein, the left boundary of the mirror is defined by 9-9' and the right boundary is defined by 13-13'; the distance between two adjacent longitudinal sections is 35 mm (the length of chord); five cross-sections of 9-13', 14-14', 15-15', 16-16', and 9'-13' are taken along the longitudinal direction; wherein, points 9 to 13 are located at upper boundary and points 9' to 13' at the lower boundary while the distance between two adjacent cross-sections is 60 mm (length of chords).

On the chord of longitudinal section of 9-9', the points are taken at every 30 mm along the vertical direction; corresponding to those points, the values of the average curvature for differential surfaces are listed as follows:

0.00092854, 0.00109159, 0.00129440, 0.00154602
0.00185649, 0.00223490, 0.00268492, 0.00319642

On the chord of longitudinal section of 10-10', the points are taken at every 30 mm along the vertical direction; corresponding to those points, the values of the average curvature for differential surfaces are listed as follows:

0.00097815, 0.00114840, 0.00135975, 0.00162151,
0.00194428, 0.00233809, 0.00280812, 0.00334625

On the chord of longitudinal section of 11-11', the points are taken at every 30 mm along the vertical direction; corresponding to those points, the values of the average curvature for differential surfaces are listed as follows:

0.00106371, 0.00124783, 0.00147525, 0.00175530,
0.00209851, 0.00251484, 0.00300936, 0.00357389

On the chord of longitudinal section of 12-12', the points are taken at every 30 mm along the vertical direction; corresponding to those points, the values of the average curvature for differential surfaces are listed as follows:

0.00118599, 0.00139144, 0.00164314, 0.00194986,
0.00232098, 0.00276458, 0.00328307, 0.00385514

On the chord of longitudinal section of 13-13', the points are taken at every 30 mm along the vertical direction; corresponding to those points, the values of the average curvature for differential surfaces are listed as follows:

0.00132711, 0.00155821, 0.00183845, 0.00217520,
0.00257560, 0.00304383, 0.00357748, 0.0041604

On the chord of longitudinal section of 9-13', the points are taken at every 25 mm along the vertical direction; corresponding to those points, the values of the average curvature for differential surfaces are listed as follows:

0.00095329, 0.00099412, 0.00104999,
0.00112338, 0.00121735, 0.00137142

On the chord of longitudinal section of 14-14', the points are taken at every 25 mm along the vertical direction; corresponding to those points, the values of the average curvature for differential surfaces are listed as follows:

0.00133269, 0.00138641, 0.00146135,
0.00156117, 0.00169019, 0.00185328

On the chord of longitudinal section of 15-15', the points are taken at every 25 mm along the vertical direction; corresponding to those points, the values of the average curvature for differential surfaces are listed as follows:

0.00191464, 0.00198708, 0.00208724,
0.00221984, 0.00238972, 0.00260127

On the chord of longitudinal section of 16-16', the points are taken at every 25 mm along the vertical direction;

corresponding to those points, the values of the average curvature for differential surfaces are listed as follows:

0.00276648, 0.00286953, 0.00300276,
0.00317069, 0.00337627, 0.00361923

On the chord of longitudinal section of 9'-13', the points are taken at every 25 mm along the vertical direction; corresponding to those points, the values of the average curvature for differential surfaces are listed as follows:

0.00390717, 0.00407028, 0.00425179,
0.00445306, 0.00467147, 0.00489838

It is shown by the above data that, in the third embodiment, the values of both average curvature of the differential surfaces and the variations rate of the curvature gradually and inhomogneously increase along both vertical direction from the top to the bottom and horizontal direction away from the body of the vehicle. Since the reflecting surface in the third embodiment is a part of the rear-view mirror taken from the mirror of the first embodiment, the values of the curvature are within the range stated in the first embodiment. Also, since the reflecting surface described in the third embodiment is taken from the right and lower part of the mirror shown in the first embodiment, the average variation rate of the curvature is larger than that given in the first embodiment, and falls within the range from $0.0335 \times 10^{-4}$/mm to $0.1349 \times 10^{-4}$/mm.

In summary, the structural features of the rear view mirror for in accordance with the present invention provide the merits of wide viewing around both sides and the rear of the vehicle with blind spots eliminated and clear mirror image, which therefore, it greatly helps the vehicle driver to operate.

What is claimed is:

1. A rear-view mirror for a vehicle, comprising:
a convex reflecting surface comprising a plurality of distinct curved surfaces having respective curvatures that are smoothly joined with each other to provide a continuously varying average curvature, wherein the average curvature gradually increases along a vertical direction from a top to a bottom of the reflecting surface and also gradually increases along a horizontal direction away from a longitudinal direction of the body of the vehicle,
wherein the values of the average curvature of the distinct curved surfaces are each within a range $5.0 \times 10^{-4}$ 1/mm to $50 \times 10^{-4}$ 1/mm, and
wherein the average curvature along at least one of the vertical direction and the horizontal direction increases at an average rate of increase within a range $0.01 \times 10^{-4}$ to $0.15 \times 10^{-4}$ per mm.

2. The rear-view mirror according to claim 1, wherein:
the reflecting surface of the mirror has four corners which do not all lie in a common plane.

3. The rear-view mirror according to claim 2, wherein:
the reflecting surface is bounded by four boundaries each curved parabolically according to the equation $y=0.0038 \, x^2$.

4. A rear-view mirror for a vehicle, comprising:
a convex reflecting surface comprising a plurality of curved surfaces having respective curvatures that are smoothly joined with each other to provide a continuously varying average curvature, within the average curvature gradually increases along a vertical direction from a top to a bottom of the reflecting surface and also gradually increases along a horizontal direction away from a longitudinal direction of the body of the vehicle,
wherein said average curvature along said at least one of the vertical direction and the horizontal direction increases inhomogeneously, a rate of increase of the average curvature increases gradually in the vertical direction from the top of the bottom of the reflecting surface and in the horizontal direction away from the body of the vehicle, and
wherein the average curvature along at least one of the vertical direction and the horizontal direction increases at an average rate of increase within a range $0.01 \times 10^{-4}$ to $0.15 \times 10^{-4}$ per mm.

5. The rear-view mirror according to claim 4, wherein:
the reflecting surface of the mirror has four corners which do not all lie in a common plane.

6. The rear-view mirror according to claim 5, wherein:
the reflecting surface is bounded by four boundaries each curved parabolically according to the equation $y=0.0038 \, x^2$.

7. A rear-view system for a vehicle, comprising:
a pair of rear-view mirrors, wherein each of the mirrors has a convex reflecting surface comprising a corresponding plurality of distinct curved surfaces having respective selected curvatures that are smoothly and continuously joined with each other, wherein said curvatures of the curved surfaces increase gradually along a vertical direction from a top to a bottom of the corresponding reflecting surface and also along a horizontal direction outwardly away from a longitudinal direction of the vehicle, wherein the closer a portion of the corresponding reflecting surface is to the driver's seat of the vehicle, the smaller is the corresponding average curvature of the curved surfaces and the smaller is a rate of variation of the respective average curvature, the values of the average curvature of each of the different curved surfaces being within a range of $5.0 \times 10^{-4}$ 1/mm to $50 \times 10^{-4}$ 1/mm, and
wherein the average curvature along at least one of the vertical direction and the horizontal direction increases at an average rate of increase within a range $0.01 \times 10^{-4}$ to $0.15 \times 10^{-4}$ per mm.

8. A rear-view mirror for a vehicle, comprising:
a convex reflecting surface comprising a plurality of distinct curved surfaces having respective selected curvatures that are smoothly joined with each other to provide a continuously varying average curvature, wherein
the average curvature gradually increases along a vertical direction from a top to a bottom of the reflecting surface and also gradually increases along a horizontal direction away from a longitudinal direction of the body of the vehicle, and the average curvature along at least one of the vertical direction and the horizontal direction increases inhomogeneously at an average rate of increase within a range of $0.01 \times 10^{-4}$ to $0.15 \times 10^{-4}$ per mm.

9. A rear-view system for a vehicle, comprising:
a pair of rear-view mirrors, wherein each of the mirrors has a convex reflecting surface comprising a corresponding plurality of distinct curved surfaces having respective selected curvatures that are smoothly and continuously joined with each other, wherein said curvatures of the curved surfaces increase gradually along a vertical direction from a top to a bottom of the corresponding reflecting surface and also along a horizontal direction outwardly away from a longitudinal direction of the vehicle, wherein the closer a portion of the reflecting surface is to the driver's seat of the vehicle, the smaller is the corresponding average curvature of the curved surfaces and the smaller is a rate of variation of the respective average curvature, wherein the average curvature along said at least one of the vertical direction and the horizontal direction increases inhomogeneously, a rate of increase of the average curvature increases gradually in the vertical direction from the top to the bottom of the reflecting surface and in the horizontal direction away from the body of the vehicle, and wherein the average curvature along at least one of the vertical direction and the horizontal direction increases at an average rate of increase within a range of $0.01 \times 10^{-4}$ to $0.15 \times 10^{-4}$ per mm.

10. A rear-view mirror for a vehicle, comprising:

a convex reflecting surface having four corners which do not all lie in the same plane and having a plurality of distinct curved surfaces having respective selected curvatures that are smoothly joined with each other to provide a continuously varying average curvature, wherein the average curvature gradually increases along a vertical direction from a top to a bottom of the reflecting surface and also gradually increases along a horizontal direction away from a longitudinal direction of the body of the vehicle, and wherein the average curvature along at least one of the vertical direction and the horizontal direction increases at an average rate of increase within a range $0.01 \times 10^{-4}$ to $0.15 \times 10^{-4}$ per mm.

11. The rear-view mirror according to claim 10, wherein:

the reflecting surface is bounded by four boundaries each curved parabolically according to the equation $y=0.0038 \ x^2$.

12. A rear-view mirror for a vehicle, comprising:

a convex reflecting surface comprising a plurality of distinct curved surfaces having respective curvatures that are smoothly joined with each other to provide a continuously varying average curvature, wherein the average curvature gradually increases along a vertical direction from a top to a bottom of the reflecting surface and also gradually increases along a horizontal direction away from a longitudinal direction of the body of the vehicle, wherein the values of the average curvature of the distinct curved surfaces are each within a range $5.0 \times 10^{-4}$ 1/mm to $50 \times 10^{-4}$ 1/mm, and wherein the reflecting surface is bounded by four boundaries each curved parabolically according to the equation $y=0.0038 \ x^2$.

13. A rear-view system for a vehicle, comprising:

a pair of rear-view mirrors, wherein each of the mirrors has a convex reflecting surface comprising a corresponding plurality of distinct curved surfaces having respective selected curvatures that are smoothly and continuously joined with each other, wherein said curvatures of the curved surfaces increase gradually along a vertical direction from a top to a bottom of the corresponding reflecting surface and also along a horizontal direction outwardly away from a longitudinal direction of the vehicle, wherein the closer a portion of the corresponding reflecting surface is to the driver's seat of the vehicle, the smaller is the corresponding average curvature of the curved surfaces and the smaller is a rate of variation of the respective average curvature, the values of the average curvature of each of the different curved surfaces being within a range of $5.0 \times 10^{-4}$ 1/mm to $50 \times 10^{-4}$ 1/mm, and the reflecting surface is bounded by four boundaries each curved parabolically according to the equation $y=0.0038 \ x^2$.

14. A rear-view mirror for a vehicle, comprising:

a convex reflecting surface having four corners which do not all lie in the same plane and having a plurality of distinct curved surfaces having respective selected curvatures that are smoothly joined with each other to provide a continuously varying average curvature, wherein the average curvature gradually increases along a vertical direction from a top to a bottom of the reflecting surface and also gradually increases along a horizontal direction away from a longitudinal direction of the body of the vehicle, and the reflecting surface is bounded by four boundaries each curved parabolically according to the equation $y=0.0038 \ x^2$.

* * * * *